Aug. 1, 1967 M. L. KALPIN 3,333,860
VEHICLE IMMOBILIZING MEANS
Filed Aug. 17, 1964
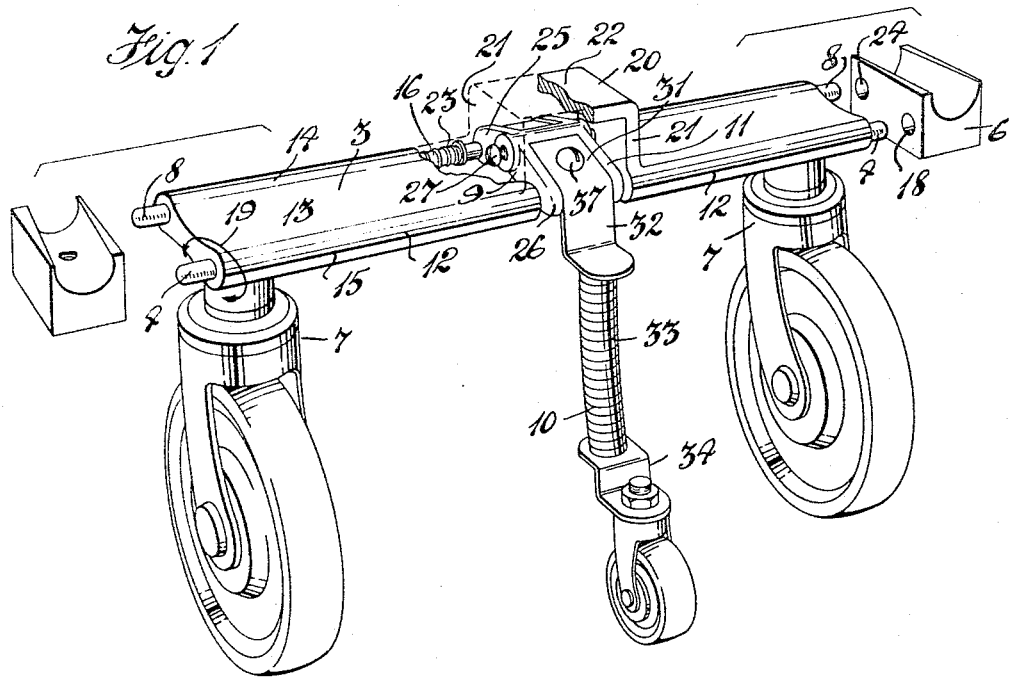
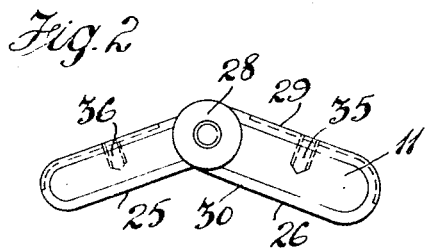
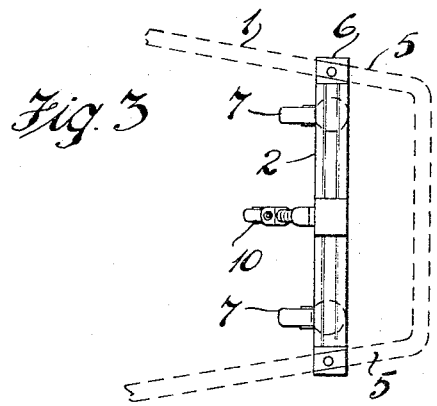
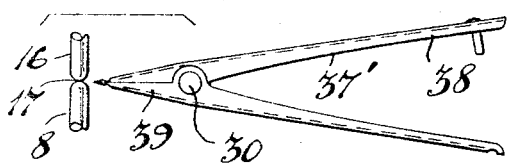
INVENTOR:
M. L. Kalpin
By:

Patented Aug. 1, 1967

3,333,860
VEHICLE IMMOBILIZING MEANS
Max L. Kalpin, 51 Timberlane Drive,
Downsview, Ontario, Canada
Filed Aug. 17, 1964, Ser. No. 389,848
9 Claims. (Cl. 280—29)

The present invention relates to means for immobilizing a vehicle, and particularly discouraging attempts to propel supermarket shopping carts beyond a circumscribing barrier, which barrier will usually, but not necessarily be or be upon the property of the supermarket. In either event, such barrier will be constituted of a ground formation of altered level relative to the ground on either side thereof. Thus it may consist of an elongated circumscribing ridge such as is frequently employed as a slow-down warning to cause entering a restricted stretch of road or area; or it may consist of an elongated, circumscribing curb beyond which, at least for a short distance the ground level will be lower. Hence, it may be the case that in referring to a circumscribing ground barrier "formed of altered ground level" the street-bounded block occupied by a given supermarket may be intended to be meant—to the extent that the sidewalk surrounding such block is bounded by a curb between it and the roadway.

More specifically, it is an object of the present invention to provide means whereby a supermarket shopping cart to which the present invention is fitted, will become immobilized due to sudden variation of the normal, vertically spaced relationship between the rotary axis of one or a pair of transversely related wheels and said chassis whereby the portion of said chassis held spaced above ground level by said wheel or wheels will drop on to the ground whenever the cart is wheeled over an undulation such as described in the last preceding paragraph.

Still more specifically the present invention consists of means for ensuring the sudden front-end collapse of a shopping cart whenever it passes over a ridge or declivity of minimum predetermined height or depth, such invention being readily adaptable to any presently known form of shopping cart, and being conspicuously simple, hence inexpensive to manufacture, and easy to install.

Yet further objects of the present invention reside in providing means for effectively preventing the average person from restoring the cart to a mobile condition, providing means whereby adjustment may be made for the height or depth of the minimum height or depth of the rise or declivity which causes collapse as aforesaid, which provides means whereby collapse will only occur, if desired, upon the cart passing over a ridge or a declivity, for blocking the invention against permitting collapse of the cart either when passing over a ridge or declivity, and providing a specifically designed tool for quickly restoring the cart to mobile condition.

With the foregoing objects in view, and such others as may become apparent as this specification proceeds, the invention consists in the following construction and arrangement of parts, all as hereinafter more particularly described, reference being had to the accompanying figures in which:

FIGURE 1 is a perspective representation of the present invention with certain parts shown fragmented.

FIGURE 2 is a side elevation of the thrust-rod intercepting spreader-block forming part of the present invention.

FIGURE 3 is a plan detail depicting the manner in which the present invention is connected to a shopping cart chassis.

FIGURE 4 is an illustration of the form of tool employed for re-loading the thrust-block locking means forming part of the present invention.

Like characters of reference designate similar parts in the several figures.

A primary purpose of the present invention is to prevent the removal of a shopping cart from a supermarket or shopping center. Considerable loss is incurred by supermarket owners of these vehicles some of which are wheeled beyond reasonable limits more or less innocently under varying circumstances, and some of which are stolen when found abandoned, and frequently sold in distant smaller towns.

By way of preliminary description, and for purposes of orientation having regard to the claims forming part of this specification the present invention is summarized in the following terms:

Spanning the chassis collectively designated 1 of a supermarket cart is an assembly collectively designated 2 for discouraging attempts to propel the same beyond a territory-circumscribing, ground barrier either in the form of a ridge or a trough such as a curb. Assembly 2 comprises essentially an elongated ground wheel supporting means collectively designated 3, rotatable about a longitudinal axis thereof such as that on which lie the pair of trunnions 4. These trunnions extend into the flanking chassis members 5, or into bearing blocks 6 suitably connected to said chassis members.

Upon the said supporting means or member 3 is a pair of spaced caster wheel assemblies collectively designated 7, the same depending from supporting member 3 for swivelling about an axis normal to the central longitudinal axis of member 3. Upon the means or member 3 are what may generally be designated as disconnecting means, the same being broadly comprised in the following statement:

Extending between the outer ends of member 3 and the chassis members 5 or blocks 6 are locking means collectively designated 8. Between these locking means are lock actuating means collectively designated 9, such lock actuating means including a barrier-responsive element collectively designated 10 movable upon intercepting contact therewith by said barrier to cause unlocking of locking means 8 and thereby permit rotation of member 3 about trunnions 4.

The aforesaid lock actuating means 9 also includes a lock actuating component collectively designated 11 in the form of a thrust-rod intercepting spreader block. Means 9 and 11 are positioned in the space between the two spaced parts 12 which constitute wheel supporting member 3.

Having ascertained the main component parts of the present invention for the purpose aforesaid, a detailed description thereof follows.

In all modifications of the supermarket shopping cart widely in use at the present time, the lower portion of the chassis 1 includes the lateral or flanking members 5 of one form or another. To such a lower chassis-portion are connected four wheels, in the form of a leading pair (so called from the manner in which the cart is normally pushed) and a rear or trailing pair. Tricycle type market carts may have been employed, may somewhere be presently employed, or may in future be employed wherein the single wheel leads or trails. The present invention therefore could be readily adapted within the conceptual spirit thereof to the single wheel of a tricycle type market cart, or, for that matter to any single wheel of a four-wheeled cart, such inventive concept comprising the collapsing of any one or more wheels toward the lower portion of the chassis under the influence of any agency whatsoever which will co-operate to this result.

In the particular exemplification of the foregoing inventive concept as depicted in the accompanying drawings however a supporting member 2 of the general configuration well illustrated, spans the chassis members 5. Such supporting member will desirably take the form of a light but strong alloy casting formed in the aforesaid two parts 12 and each comprising an intermediate web section 13, and tubular marginal portions 14 and 15.

Extending through the marginal portions 14 are the already noted locking means 8 in the form of inwardly and oppositely spring biassed thrust-rods 16 having the rounded inner ends 17. Extending through the marginal portions 15 are rods, the outer ends or trunnions 4 of which conveniently may be journalled in the apertures 18 of blocks 6. Upon the axes of these rods, supporting member 3 may rotate as indicated by double-headed arrow 19.

The pair of spaced caster wheel assemblies 7 are suitably connected to the under sides of the web portions 13 for swivelling rotation about axes normal to the central longitudinal axis of said member 3. Connecting the portions 12 is a central, generally rectangular process collectively designated 20 consisting of normally vertical side wall portions 21, and an over-arching portion 22 connecting said side portions. The rods which extend through marginal portions 15 and terminate in the aforesaid trunnions 4 will (in the particular embodiment illustrated) terminate in the vertical planes of side walls 21. The locking means 8 or thrust-rods 16 will extend through the side walls 21 and meet in coaxial contact as depicted in the accompanying FIGURE 4 under the influence of springs 23 when unobstructed by component 11 as hereinafter to be described. When held spaced or spread apart against the bias of the aforesaid springs 23, it will be apparent that the outer locking ends 8 of the thrust-rods 16 enter apertures 24 in blocks 6 and hold the supporting member 3 rigidly to the chassis members 5 so that the associated cart is mobile.

It is assumed to be within the skill of the art to understand that the outer ends of springs 23 bear against an annular shoulder within the tubular passageways in which the thrust-rods 16 move, and that the inner ends of such springs bear against a cross-key of standard design extending diametrically through the thrust-rods at the inner ends thereof. Within the process or housing 20 is the aforementioned lock-actuating component 11 of lock-actuating means collectively designated 10, such component taking the form of an obtusely angulated crank comprised of the arms 25 and 26 pivotally connected for vertical rotation to the side wall portions 21 as by means of the screws or bolts 27 which constitute trunnions extending through the said wall portions and into the center, pivotal portion 28 of component 11.

The arms 25 and 26 of component 11 have flanking surfaces which may desirably be cambered, or outwardly convexed as between the upper and lower edges 29 and 30. The upper surfaces of arms 25 and 26 are also desirably recessed to accommodate snugly the apertured portion 31 of the angle bracket 32 to the lower end of which is connected in any suitable way the preferably, but not necessarily, flexible arm or leg 33 forming part of the barrier-responsive element collectively designated 10. At the lower end of the detail 33 is a swivelling caster assembly collectively designated 34 also forming part of element, or perhaps more properly assembly, 10.

The apertures 35 and 36 in arms 25 and 26 may, either of them, accommodate the screw 37 or the like by means of which detail 32 is held to component 11. On the other hand, either or both of these apertures may be employed to accommodate a block or stub shaft extending between the upper surfaces of the arms 35 and 36 and the under surface of over-arching housing portion 22. The purpose of such stub shafts or blocks is to immobilize the lock-actuating means and hold component 11 against rotation regardless of any undulation sensed by the swivelling ground assembly 34. Alternately of course one stub shaft or block may be placed in either of the apertures 35 or 36. If placed in aperture 35 the invention will be non-responsive to any projecting ridge over which the caster assembly 34 is wheeled. If placed in aperture 36 the invention will be non-responsive to any declivity or curb over which the caster 34 passes.

From a contemplation of the depicted invention in relation to the foregoing description up to this point, it will be apparent that the locking means 8 are normally held spread apart and in locking position by the arms 25 of component 11. When the arm 25 is rotated clockwise with respect to the accompanying FIGURE 2, such rotation will be due to the barrier-responsive element 10 having sensed and moved downwardly into a trough such as the down-step of a curb. Locking means 8 will then snap inwardly and caster assemblies 7 will collapse upwardly toward or into the horizontal plane of the chassis members 5.

Alternatively, when the arm 25 is rotated counter-clockwise, it will be because the element or assembly 10 has sensed and contacted a ridge or eminence in the ground over which the cart is being wheeled, sufficient to cause such counter-clockwise rotation, and again the caster assemblies 7 will collapse due to rotation of supporting member 3 about the trunnions 4 in the manner described.

It is important of course to understand that caster assembly 34 must trail or lead the caster or pair of casters 7, and not be rolling upon the same transverse line-contact with the ground. It is also highly desirable that the casters be in some suitable manner given sufficient weight to ride the ground with substantial gravitational pull. In the accompanying FIGURE 2 it will be observed that arm 26 is deeper than arm 25. This is only for the purpose of illustrating that, according to requirements, component 11 may be reversed within the process or housing 20 for longer or shorter dwell, in other words greater or less yielding over a "hump" or into a trough, of the element or assembly 10 via the caster assembly 34.

It will equally be apparent that if desired the rods, the ends of which constitute trunnions 4 may also be spring loaded thrust-rods. In such case the supporting member 3 might be caused to rotate about the locking means 8 upon rotation (or linear movement) in one direction of a modified version of component 11, and about trunnions 4 in an opposite direction. In other words, arrangements within process or housing 20 might very well be modified in such a way that the supporting member 3 would rotate about the elements 8 when a depression was encountered or sensed, and about elements 4 when an eminence in the ground was encountered or sensed. Likewise it will be apparent that component 11 as depicted in the accompanying FIGURE 2 may be of two part conformation wherein the angulation of the arms 25 and 26 may be varied according to choice and suitably set at the degreed angular relationship.

It should also be disclosed that as an alternative to the process or housing 20, the two parts 12 and 13 of member 3 might be united simply by a strong stub shaft corresponding to 27 about which a component such as 11 might be connected to rotate as already described. Thus the possibility of blocking the component 11 by inserting a block between it and the over-arching portion 22 on both sides of the point of rotation generally designated 28 would be eliminated.

In the accompanying FIGURE 4 is illustrated the pliers collectively designated 37—by means of which the thrust-rods 16 may be spread apart. The same comprises a pair of handles 38, and a two-part divided nose collectively designated 39 of wedge-shaped configuration. The handles and nose are separated by the pivotal connection 30 therebetween. The pliers will preferably be spring biassed into the position depicted. When it is desired to spread the rods 16, such a pair of pliers can conveniently be inserted between the rounded ends 17 thereof for this purpose.

It will be apparent that the inventive concept herein can be applied to various forms of wheeled vehicles. It should also be added that it can be adapted to various forms of chassis, and either to the front, rear, or intermediate parts thereof. Accordingly various modifications can be made to the novel subject-matter herein, without departing from the inventive concept which the same embodies, and it is therefore not intended that protection of this invention by Letters Patents should be interpreted as restricted to the particular modification or modifications thereof particularly described and exemplified.

What I claim as my invention is:

1. In combination with a vehicle chassis, means for discouraging attempts to propel the associated vehicle beyond a territory-circumscribing, ground barrier formed of altered ground level, said means comprising structure co-acting between said chassis and at least one of the ground wheels of said vehicle for varying the normal vertically spaced relationship between the rotary axis of said wheel and said chassis whereby the portion of said chassis held spaced above ground level by said wheel will subside onto the ground and thereby effectively immobilize said vehicle, said means comprising a wheel-supporting member rotatably connected to said chassis about an axis other than that of the wheel supported thereby, means effectively co-acting between said member and said chassis for locking said member against rotation, and further means effectively co-acting with said locking means for unlocking said member upon intercepting contact of said further means with said barrier, thereby permitting rotation of said wheel-supporting member.

2. In combination with a vehicle chassis, means for discouraging attempts to propel the associated vehicle beyond a territory-circumscribing, ground barrier formed of altered ground level, said means comprising structure co-acting between said chassis and at least one of the ground wheels of said vehicle for varying the normal vertically spaced relationship between the rotary axis of said wheel and said chassis whereby the portion of said chassis held spaced above ground level by said wheel will subside onto the ground and thereby effectively immobilize said vehicle, said means comprising an elongated, wheel-supporting member spanning said chassis and connected thereto for rotation about a longitudinal axis thereof, a pair of spaced caster wheel assemblies connected to and depending from said member for swivelling rotation about an axis normal to the central longitudinal axis of said supporting member, locking means extending between said member and said chassis capable of locking said member against rotation upon actuation thereof, and lock actuating means effectively co-acting with said locking means for moving the same between locking and unlocking positions, said lock actuating means including a barrier-responsive element movable upon intercepting contact therewith by said barrier to cause unlocking of said locking means and thereby permit rotation of said wheel-supporting member about said longitudinal axis thereof.

3. The locking and lock-actuating means according to claim 2 wherein said locking means comprise essentially a pair of inwardly, oppositely spring-biassed thrust-rods connected to said supporting member upon one side of the axis of rotation of said member, said lock-actuating means also including a lock-actuating component connected to said supporting member and positioned between said caster wheel assemblies, said component being movable under the influence of said barrier-responsive element to permit inward release of said rods and consequent rotation of said wheel-supporting member.

4. The device according to claim 2 in which said lock-actuating component is in the form of a thrust-rod intercepting spreader block horizontally trunnion-journalled for vertical rotation in said supporting member.

5. The device according to claim 4 in which said barrier-responsive element comprises an arm oppositely connected to said spreader-block and depending downwardly therefrom, and a swivelling ground-wheel attached to the lower end of said arm.

6. In association with the device according to claim 3, and for use in re-loading said thrust-rods, a pair of pliers consisting of a pair of handles and a 2-part divided nose of wedge-shaped configuration, said handles and said nose being connected by a pivotal connection therebetween, said handles being normally spring-biassed and movable together to separate said two parts of said nose after insertion thereof between the inner ends of said thrust-rods prior to admission of said lock-actuating component between said ends.

7. The lock-actuating component according to claim 3 which is in the form of an obtusely angulated crank, said barrier-responsive element being secured to and projecting from one of the arms thereof and comprising a flexible arm depending downwardly from said supporting member and a swivelling ground-wheel attachable to the lower end of said arm.

8. The device according to claim 2 in which said barrier-responsive element comprises an arm depending downwardly from said supporting member, and a swivelling ground-wheel attached to the lower end of said arm.

9. The means according to claim 1 in which said supporting member is formed of two spaced parts, means for connecting said parts in rigid relationship, said lock-actuating component being positioned in the space between said two parts.

References Cited

UNITED STATES PATENTS

| | | | |
|---|---|---|---|
| 874,969 | 12/1907 | La Fleur | 280—11 |
| 2,446,518 | 8/1948 | Arnold et al. | 280—43.24 |
| 2,490,953 | 12/1949 | Eriksen | 16—33 |
| 2,964,140 | 12/1960 | Berezy | 280—33.99 |
| 3,002,370 | 10/1961 | La Brie | 280—33.99 |
| 3,029,905 | 4/1962 | Nowak | 188—111 |
| 3,031,037 | 4/1962 | Stollman | 188—111 |
| 3,031,038 | 4/1962 | Chait | 188—111 |
| 3,090,470 | 5/1963 | Abrams. | |
| 3,186,728 | 6/1965 | Turlington | 280—33.99 |

BENJAMIN HERSH, *Primary Examiner.*

MILTON SMITH, *Examiner.*